United States Patent [19]
Thompson

[11] Patent Number: 5,444,855
[45] Date of Patent: Aug. 22, 1995

[54] SYSTEM FOR GUARANTEED CPU BUS ACCESS BY I/O DEVICES MONITORING SEPARATELY PREDETERMINED DISTINCT MAXIMUM NON CPU BUS ACTIVITY AND INHIBITING I/O DEVICES THEREOF

[75] Inventor: Stephen P. Thompson, Delray Beach, Fla.

[73] Assignee: International Business Machines Corporation, Armonk, N.Y.

[21] Appl. No.: 870,581

[22] Filed: Apr. 17, 1992

[51] Int. Cl.[6] ............................................ G06F 13/36
[52] U.S. Cl. .................... 395/287; 395/865; 364/240.5; 364/242.6; 364/242.92; 364/DIG. 1
[58] Field of Search ............... 395/275, 425, 550, 725; 364/143, 474.16, 569

[56] References Cited

U.S. PATENT DOCUMENTS

| | | | |
|---|---|---|---|
| 3,597,060 | 6/1971 | Quinn et al. | 395/325 |
| 4,574,350 | 3/1986 | Starr | 374/86 |
| 4,620,278 | 10/1986 | Ellsworth et al. | 395/575 |
| 4,987,529 | 1/1991 | Craft et al. | 395/325 |
| 5,099,420 | 3/1992 | Barlow et al. | 395/325 |
| 5,193,179 | 3/1993 | Laprede et al. | 395/575 |

OTHER PUBLICATIONS

Belady et al, "Time–Dependent Data–Locking Mechanism" Apr. 1977, IBM Technical Disclosure Bulletin, pp. 4485–4486.

*Primary Examiner*—Thomas C. Lee
*Assistant Examiner*—Sang Hui Kim
*Attorney, Agent, or Firm*—Calfee Halter & Griswold

[57] ABSTRACT

A method and system for controlling access to a system bus in a computer system is provided. The system devices include a central processing unit, a memory controller for controlling access to system memory, and at least one input/output device having a coprocessor incorporated therein. The system bus electrically connects the system devices. Any one of the system devices may serve as a bus master of the system bus at any one time when communicating over the bus with each other or with system memory. Each of the at least one input/output device incorporates control logic therein for (i) monitoring bus activity to calculate the bus mastering time during which the memory controller and the at least one input/output device control the bus, and (ii) outputting an inhibit signal which denies access to the bus by the at least one input/output device if the calculated bus mastering time is equal to or greater than a predetermined bus mastering time period.

20 Claims, 2 Drawing Sheets

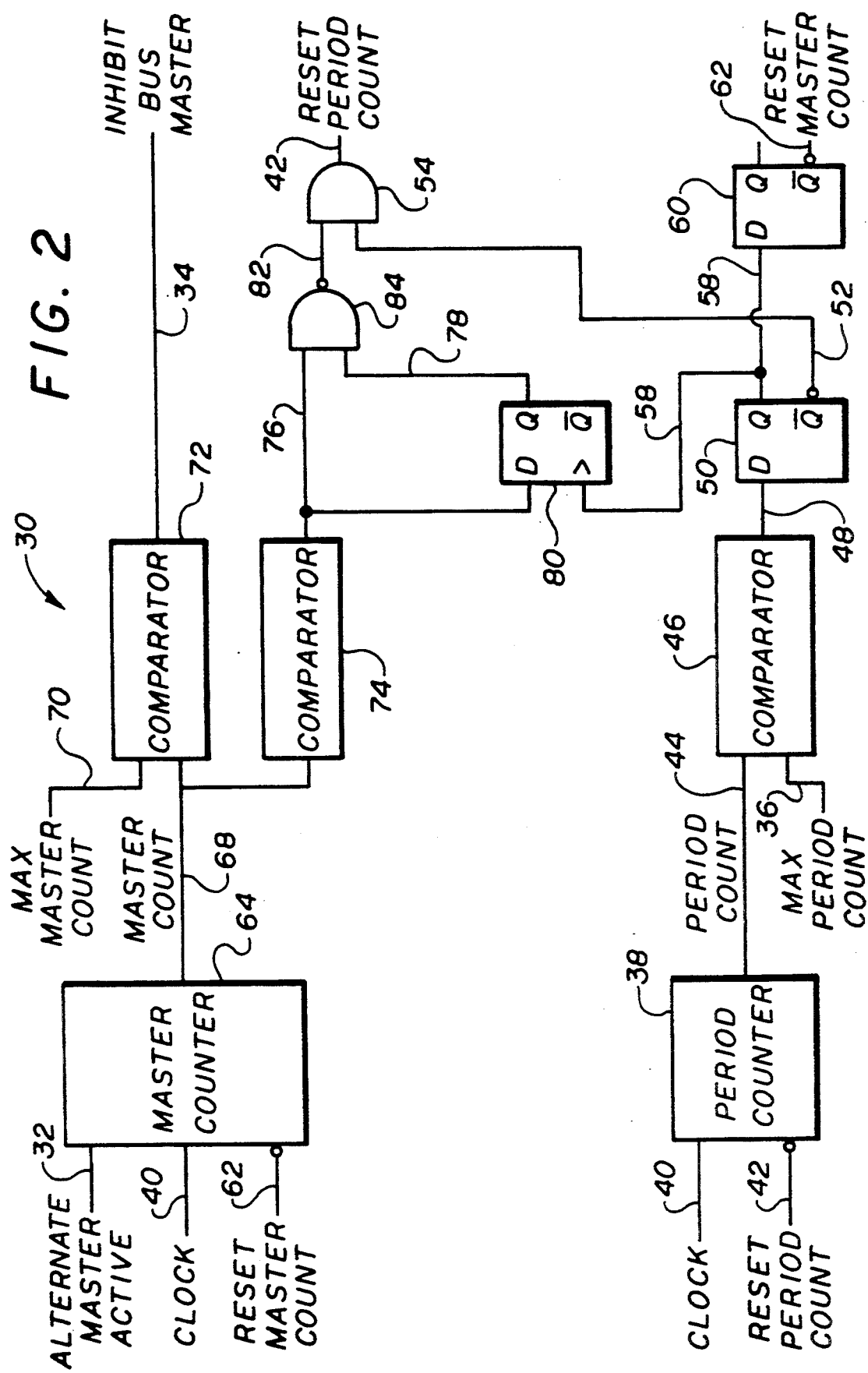

SYSTEM FOR GUARANTEED CPU BUS ACCESS BY I/O DEVICES MONITORING SEPARATELY PREDETERMINED DISTINCT MAXIMUM NON CPU BUS ACTIVITY AND INHIBITING I/O DEVICES THEREOF

FIELD OF THE INVENTION

The present invention relates generally to computer system architecture, and more specifically to a synchronization and arbitration scheme which insures that the central processing unit in the system is provided with a minimum predetermined time period during which it may access the system bus.

BACKGROUND OF THE INVENTION

Generally in computer systems and especially in personal computer systems, data is transferred between various system devices such as the central processing unit (CPU), memory devices, and direct memory access (DMA) controllers. In addition, data may be transferred between expansion elements such as input/output (I/O) devices, and between these I/O devices and the various system devices. The I/O devices and the system devices communicate with and amongst each other over computer buses, which comprise a series of conductors along which information is transmitted from any of several sources to any of several destinations. Many of the system devices and the I/O devices are capable of serving as bus masters which can control operations occurring on the computer bus.

Personal computer systems typically are architected in a single bus or dual bus configuration. In a dual bus system, bus masters may operate simultaneously on both buses. In a single bus configuration, however, only one bus master may control the system bus at a given instant in time, because simultaneous activity on the bus is prohibited. Accordingly, efficient use of the system bus by both system devices and I/O devices is an important consideration in the overall system design.

During normal operation of a single bus computer system, both the CPU and the various I/O devices capable of operating as bus masters compete for control of the single system bus. Typically, direct memory access DMA channels handle arbitration between the CPU and the various I/O devices. Once a bus master obtains control of the bus, however, there are no rules to limit the time during which it can maintain exclusive control of the bus. Thus, the system processor could be locked out if a particular I/O device gains control of the bus and maintains such control while performing a time consuming operation, or passes control of the bus to another bus master device. The problem is exaggerated if more than one I/O device having bus master capabilities is installed in the system. In such a case, the multiple I/O devices may alternatively pass control of the system bus back and forth to each other, thereby effectively cutting off the ability of the CPU to access the system bus.

It is an object of the present invention, then, to provide a synchronization and arbitration scheme which determines the ability of a system device or an I/O device to gain access to the system bus, which prevents CPU lockout during normal operation of the computer system, and which permits efficient and effective data transfer over the system bus.

SUMMARY OF THE INVENTION

According to the present invention, a synchronization and arbitration control circuit is provided for a single bus computer system. The computer system includes devices able to communicate with each other over a system bus which comprises a local processor bus and an input output (I/O) bus. Because the local processor bus and the I/O bus communicate using the same logic, these two buses effectively form the single system bus, control of which may be given to only one bus master at any given time. The local processor bus supports a central processing unit (CPU) and system memory, and the I/O bus supports a direct memory access (DMA) controller and any of a number of I/O devices which may serve as system bus masters. The devices in the system which are capable of serving as bus masters include the CPU, the DMA controller, and any I/O device having a coprocessor.

Because the DMA controller, the I/O bus master devices and the CPU compete for access to the system bus, the present invention provides a synchronization and arbitration control circuit which inhibits bus master operation of the I/O devices to provide the CPU with a minimum amount of time during which it may access the system bus. The control circuit is implemented on and controls the operation of one or more of the I/O devices, but is capable of monitoring the bus mastering activity of I/O devices which do not incorporate the circuit.

The system input to the control circuit is active whenever the DMA controller or any I/O device in the system is acting as a bus master on the system bus. The output is a signal which inhibits any I/O device on which the control circuit is implemented from gaining access to the system bus. Bus master activity is monitored on the system bus during a time period T which is defined by a max period count. A period counter outputs a period count which is compared with the max period count. When the period count reaches the max period count, the period counter is reset and begins to count again during the next time period T.

The control circuit simultaneously monitors the time M during each period T wherein non-CPU bus activity is occurring. A maximum value of M is programmed into each of the control circuits in the system, and is defined as the maximum time that any non-CPU bus activity will be permitted. A master counter monitors bus master activity during the period T whenever the DMA controller or any I/O device in the system is acting as a bus master on the system bus. Once the maximum M value is detected by the control circuit, an inhibit signal is output to each of the I/O devices on which the circuit is installed. With the inhibit activated, none of the devices on which the circuit is installed can request access to the system bus until the period counter is reset, indicating the start of the next time period T. Accordingly, the CPU 18 is allotted a time equal to the time (T-M) during which it will not compete with the I/O devices for access to the system bus.

During times of system inactivity, as when neither the I/O devices nor the DMA controller is controlling the system bus, the period counter is prevented from beginning a new count cycle. As soon as non-CPU activity is sensed on the system bus, however, the period counter begins to start counting a new period T, and the master counter begins to count again. Accordingly, the operation of all of the circuits installed on I/O devices in the system are synchronized in time.

BRIEF DESCRIPTION OF THE DRAWINGS

FIG. 2 is a circuit diagram of the control circuit of FIG. 1.

DETAILED DESCRIPTION OF THE PREFERRED EMBODIMENT

Figure 1:
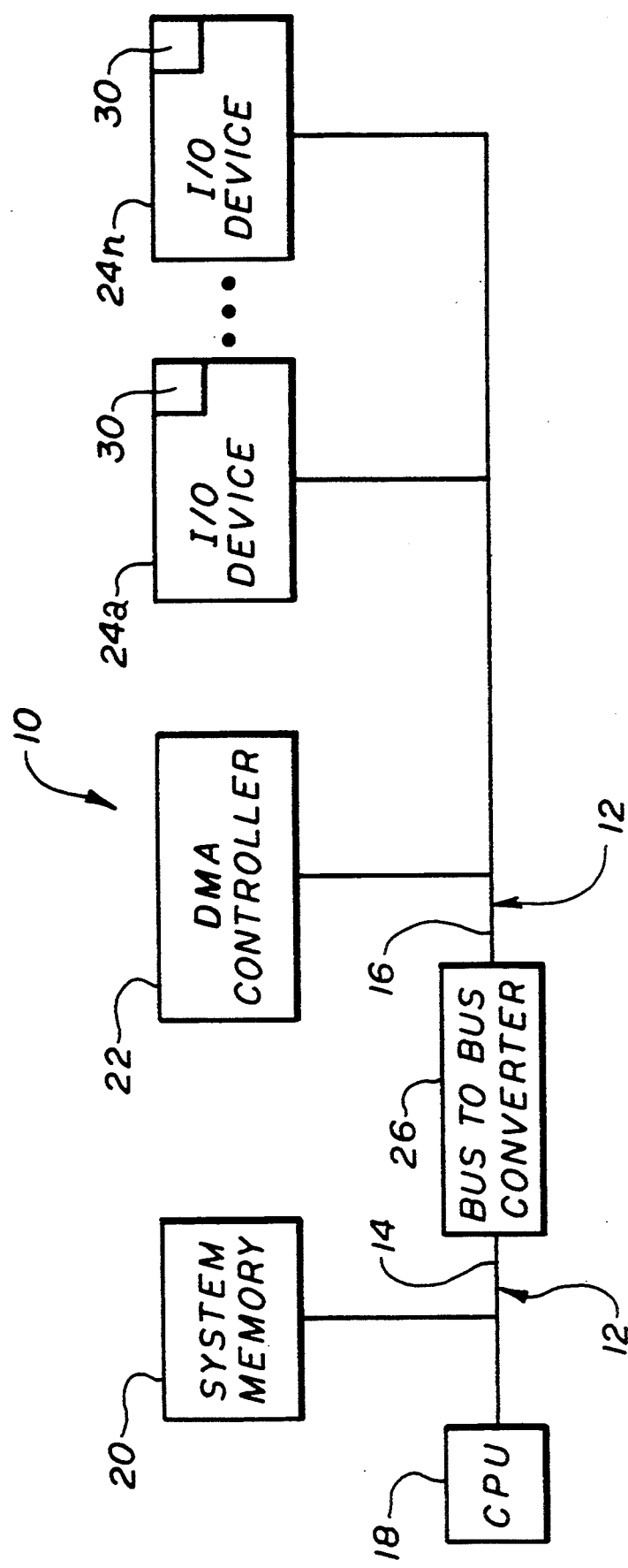
FIG. 1 is a schematic block diagram of a computer system incorporating a synchronization and arbitration control circuit constructed according to the principles of the present invention.

Referring now to the drawings, FIG. 1 shows a computer system 10 which utilizes the synchronization and arbitration scheme of the present invention. The computer system 10 includes devices which communicate with each other over a system bus 12. The system bus 12 consists of a local processor bus 14 and an input output (I/O) bus 16. The local processor bus 14 supports a central processing unit (CPU) 18 and system memory 20. The I/O bus 16 supports a direct memory access (DMA) controller 22 and any of a number of I/O devices 24a-24n which may serve as system bus masters. The DMA controller 22 controls the interchange of information between the system memory 20 and expansion memory which may reside on any of the I/O devices 24a-24n.

The local processor bus 14 and the I/O bus are electrically connected to each other by a bus to bus converter 26. The bus to bus converter 26 provides the means by which system devices such as the CPU 18 may communicate with the DMA controller 22 or the I/O devices 24a-24n, or by which the DMA controller 22 or the I/O devices 24a-24n may communicate with the CPU 18 or with system memory 20. Because the local processor bus 14 and the I/O bus 16 communicate using the same logic, these two buses effectively form the single system bus 12, control of which may be given to only one bus master at any given time. The devices in the system 10 which are capable of serving as bus masters to thereby control data transfer over the system bus include the CPU 18, the DMA controller 22, and any of the I/O devices 24a-24n having a coprocessor.

The CPU 18 must periodically perform functions within the system, such as servicing timing interrupts. In order to perform such functions, the CPU 18 needs to obtain control of the system bus 12. The DMA controller 22 and the I/O devices capable of serving as system bus masters also need to obtain control of the system bus when serving as bus masters. Because the DMA controller, the I/O bus master devices and the CPU 18 compete for access to the system bus 12, the present invention provides the means by which bus master operation of the I/O devices may be inhibited to provide the CPU 18 with a minimum amount of time during which to perform its functions over the system bus 12. In the preferred embodiment, the means to inhibit the bus master operation of the I/O devices comprises a synchronization and arbitration control circuit 30 which is implemented on each of the I/O bus master devices 24a-24n.

The control circuit 30 is capable of preventing each of the I/O devices on which it is implemented from requesting the system bus 12 if the circuit 30 has determined that the CPU 18 should be granted access to the bus. The control circuit 30 determines when the CPU needs such access by monitoring bus activity for bus master operations by the DMA controller 22 and the I/O devices 24a-24n. The control circuit 30 may also monitor bus activity for bus master operations by I/O devices which do not include the circuit.

FIG. 2 shows a circuit diagram which implements the control circuit 30. The system input 32 to the circuit 30 is an alternate master active signal which is active whenever non-CPU activity is occurring on the system bus 12, i.e., the DMA controller 22 or any I/O device 24a-24n in the system is acting as a bus master on the system bus. The output 34 is an inhibit bus master signal which, when active, prevents any I/O device 24a-24n on which the circuit 30 is implemented from gaining access to the system bus.

The control circuit 30 operates within a period T during which bus master activity is monitored on the system bus 12. The period T is a specific time interval which is selectable by the user and, although not a critical aspect of the invention, in the preferred embodiment is set at about 100 $\mu$sec. The period T is defined by a corresponding max period count input 36 which is programmable. A period counter 38 which operates on a clock signal 40 counts whenever a reset period count 42 input is inactive. The period counter 38 outputs a period count output 44 which is compared with the max period count input 36 at comparator 46. When the period count reaches the max period count, the comparator 46 outputs a signal 48 which is sampled by a D-flip flop 50. The inverted output 52 of the D-flip flop 50 is fed directly into AND gate 54 which outputs the reset period count 42, as long as a second counter associated with monitoring non-CPU system bus activity during the period T has also been resets as will be explained below. In this manner, the period counter 38 will be reset and begin to count again each time the period count 44 reaches the max period count 36, indicating that the present period T has been completed.

The non-inverted output 58 of the D-flip flop 50 is fed into D-flip flop 60. D-flip flop 60 responds by outputting a reset master count signal 62 on its inverted output which is used as an input in the portion of the circuit 30 described below.

The control circuit 30 monitors the time during each period T wherein non-CPU bus activity is occurring. M is defined as the maximum time that any non-CPU bus activity will be permitted, and is programmed into each of the circuits 30 implemented in the system 10. A master counter 64 uses a clock signal 66 to count during the period T whenever (i) the reset master count signal 62 is inactive and (ii) the alternate master active signal is active, indicating that the DMA controller 22 or any of the I/O devices 24a-24n in the system is acting as a bus master on the system bus 12. The output of the master counter 64 is a master count signal 68 which is compared to a max master count 70 at comparator 72. The max master count corresponds to the maximum time M allocated for non-CPU bus mastering activity, and hence, the CPU 18 is allotted a time equal to the time (T-M) during which it will not compete with the I/O devices 24a-24n for access to the system bus 12.

Once the master count 68 reaches the max master count 70, the comparator 72 outputs the inhibit bus master signal 34 to each of the I/O devices 24a-24n on which the circuit 30 is installed. When the inhibit bus master signal is activated in this manner, none of the I/O devices on which the circuit 30 is installed can request access to the system bus 12. These particular I/O devices will not request access to the system bus 12 until the period counter 38 is reset, indicating the start of the next time period T.

The master count 68 is also fed to comparator 74 which outputs a zero count 76 any time the master count 68 equals zero. The master count will equal zero at any time the reset master count signal 62 is activated to reset the master counter 64. When the comparator 74 senses a master count of zero, it results in a signal 78 at the noninverted output of D-flip flop 80 which causes an active signal 82 at the output of NAND gate 84. Accordingly, the period counter 38 is reset by the reset period count when the period count 44 reaches the max period count, and is held reset if the comparator 74 senses that the master count M is zero when the period count 44 reaches the max period count. The non-inverted output 58 of the D-flip flop 50 is used to clock the D-flip flop 80 whenever the period count reaches the max period count and the period counter 38 has been reset.

During times of system inactivity, as when neither the I/O devices nor the DMA controller, is controlling the system bus 12, the reset period count 42 is held active, thereby inhibiting the period counter 38 from beginning a new count cycle. As soon as non-CPU activity is sensed on the system bus 12, however, simultaneously (i) the master counter 64 begins to count again in response to the alternate master active signal, and (ii) the comparator 74 senses a non-zero master count 68, which deactivates the reset period count 42 so that the period counter begins to start counting a new period T. Accordingly, the operation of all of the circuits 30 installed on I/O devices 24a-24n in the system 10 are synchronized in time. Synchronization is required because the I/O devices need to know when they are permitted to or prevented from requesting access to the system bus 12.

Although the invention described above may be implemented on any I/O device which is provided with a coprocessor which is capable of controlling the system bus 12, particular applications are contemplated on graphics cards which are either plugged into the I/O bus 16 or are implemented as a chip configuration which resides on the I/O bus. Such graphics cards have their own video RAM (VRAM) and a coprocessor which accesses this video VRAM or the system memory 20. Access to system memory is completed over the local processor bus 14, while access to the VRAM is accomplished over the I/O bus.

I/O devices which do not have the circuit 30 implemented thereon may still work within the system 10. The bus mastering activity of these devices is still monitored by those I/O devices provided with the circuit 30, but their access to the system bus would not be inhibited by the inhibit bus master signal. Because the DMA controller 22 controls its own system bus request and relinquish commands, its operation would also be unaffected by the inhibit bus master signal. Although the operation of the master counter 64 is global in the sense that it monitors all non-CPU bus activity, only I/O devices having the circuit 30 incorporated therein will respond to the inhibit bus master signal.

Accordingly, the preferred embodiment of a system for controlling access to a system bus in a computer system has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

I claim:

1. A computer system, comprising:
   system memory and a memory controller for controlling access thereto;
   a central processing unit (cpu);
   at least one input/output device having a coprocessor incorporated therein;
   a system bus for electrically connecting said system memory, said memory controller, said central processing unit and said at least one input/output device, control of which bus may be taken by any one of said memory controller, said central processing unit and said at least one input/output device when communicating over said bus with each other or with said system memory, each of said at least one input/output device assigned separately a predetermined distinct maximum time period indicating a maximum time period of non-cpu bus activity;
   said at least one input/output device incorporating bus control logic therein for (i) storing a value corresponding to said separately predetermined distinct maximum time period therein, (ii) monitoring bus activity to count the bus mastering time during which either said memory controller or one of said at least one input/output devices controls said bus, irrespective of the number of data transfer operation constituting said bus activity which are initiated by said memory controller or said at least one input/output device and (iii) outputting an inhibit signal which denies access to said bus by said at least one input/output device in which said bus control logic is incorporated, if said counted bus mastering time is equal to or greater than the separately predetermined distinct maximum time period indicating a maximum time period of non-cpu bus activity assigned to that input/output device enabling said cpu to access said system bus; and
   wherein said control logic on each of said at least one input/output device monitors said bus activity during the same predetermined monitoring time; and
   wherein a first counter is used to count said predetermined monitoring time period and a second counter is used to count said bus mastering time elapsing during said predetermined monitoring time period.

2. The computer system of claim 1, wherein said at least one input/output device comprises at least two input/output devices, wherein said distinct maximum time periods are of a different duration, and wherein said predetermined monitoring time period and said predetermined distinct maximum time periods are programmably selectable.

3. The computer system of claim 1, wherein a first comparator outputs a first reset signal to reset said first counter and said second counter in response to a comparison of an output of said first counter with said predetermined monitoring time period.

4. The computer system of claim 4, wherein a second comparator outputs said inhibit signal in response to a comparison of an output of said second counter with said predetermined distinct maximum time period.

5. The computer system of claim 1, wherein operation of said first counter and said second counter is synchronized in time.

6. The computer system of claim 5, wherein said predetermined monitoring time period is around 100 μsec.

7. The computer system of claim 5, further comprising alternate input/output devices which do not incorporate said control logic but which do include coprocessors enabling said alternate input/output devices to control said system bus, operation of which alternate input/output devices on said bus is monitored by said at least one input/output device incorporating said control logic.

8. The computer system of claim 5, wherein said at least one input/output device includes more than one input/output device, and wherein said control logic incorporated into each of said input/output devices is synchronized in time at the onset of each predetermined monitoring time period.

9. A method of synchronizing and arbitrating control of a computer system bus on which reside devices including system memory, a memory controller, a central processing unit, and at least one input/output device having a coprocessor and bus control logic incorporated therein, and one of which devices may control the system bus, said method comprising the steps of:
selecting and storing within said control logic a predetermined monitoring time period and a separately predetermined distinct maximum time period for each of said at least one input/output devices, said distinct maximum time period defining for each of said at least one input/output devices a maximum time interval during which it may control said bus;
monitoring with said bus control logic bus activity occurring during said predetermined monitoring time period to count bus mastering time during which either the memory controller or any of the at least one input/output devices controls said bus, irrespective of the number data transfer operations constituting said bus activity which are initiated by said memory controller or said input/output devices;
determining with said bus control logic if said bus mastering time period is equal to or greater than said separately predetermined distinct maximum time period selected for each of said at least one input/output devices in the system; and
outputting using said bus control logic an inhibit signal, in response to said determination, which signal denies access to said bus by said at least one input/output device having said bus control logic incorporated therein, if said bus mastering time period is equal to or greater that said separately predetermined distinct maximum time period selected for that particular input/output device enabling said central processing unit access to said system bus; and
wherein said step of monitoring said bus activity includes the steps of using control logic on each of said at least one input/output device to monitor said bus activity during the same predetermined monitoring time; and
wherein said step of monitoring said bus activity further includes the steps of using a first counter to count said predetermined monitoring time period and a second counter to count said bus mastering time elapsing during said predetermined monitoring time period.

10. The method of claim 9, wherein a first comparator outputs a first reset signal to reset said first counter and said second counter in response to a comparison of an output of said first counter with said predetermined monitoring time period.

11. The method of claim 9, wherein a second comparator outputs said inhibit signal in response to a comparison of an output of said second counter with said predetermined distinct maximum time period.

12. The method of claim 9, wherein operation of said first counter and said second counter is synchronized in time.

13. The method of claim 12, wherein said predetermined monitoring time period is selected to be around 100 μsec.

14. The method of claim 11, further comprising the steps of:
providing alternate input/output devices which include coprocessors enabling said alternate input/output devices to control said system bus, but which do not respond to said inhibit signal; and
monitoring bus activity during said predetermined monitoring time period to count bus mastering time elapsing during which the said alternate input/output devices control said bus.

15. An input/output device for installation in a computer system bus which electrically connects the I/O device to a central processing unit, system memory and a memory controller, control of which bus may be taken by any one of the memory controller, the central processing unit and the I/O device when communicating over the bus with each other or with system memory; the I/O device including:
bus control logic incorporated therein for (i) storing a value corresponding to a separately predetermined distinct maximum time period during which the I/O device may control said bus; (ii) monitoring bus activity to count a bus mastering time during which either the memory controller or the I/O device controls the bus, irrespective of the number of data transfer operations constituting said bus activity which are initiated by said memory controller or said input/output devices, and (iii) outputting an inhibit signal which denies access to the system bus by the I/O device if said counted bus mastering time is equal to or greater than the separately predetermined distinct maximum time period stored in the I/O device enabling said central processing unit to access said system bus; and
wherein said control logic monitors said bus activity during a predetermined monitoring time period; and
wherein a first counter is used to count said predetermined monitoring time period and a second counter is used to count said bus mastering time elapsing during said predetermined monitoring time period.

16. The computer system of claim 15, wherein said predetermined monitoring time period and said predetermined distinct maximum time periods are programmably selectable.

17. The computer system of claim 15, wherein a first comparator outputs a first reset signal to reset said first counter and said second counter in response to a comparison of an output of said first counter with said predetermined monitoring time period.

18. The computer system of claim 15, wherein a second comparator outputs said inhibit signal in response to a comparison of an output of said second counter with said predetermined distinct maximum time period.

19. The computer system of claim 15, wherein operation of said first counter and said second counter is synchronized in time.

20. The computer system of claim 19, wherein said predetermined monitoring time period is around 100 $\mu$sec.

* * * * *